United States Patent [19]

Blanchaud et al.

[11] 4,143,167

[45] Mar. 6, 1979

[54] PROCESS FOR TREATMENT OF MUSHROOMS

[76] Inventors: Maurice Blanchaud; Edgar Bournier, both of Chace, France, 19580

[21] Appl. No.: 750,451

[22] Filed: Dec. 14, 1976

Related U.S. Application Data

[63] Continuation-in-part of Ser. No. 608,272, Aug. 27, 1975, abandoned, which is a continuation of Ser. No. 394,275, Sep. 4, 1973, abandoned.

[30] Foreign Application Priority Data

Sep. 4, 1972 [FR] France .................................. 72 31308

[51] Int. Cl.² .............................................. A23B 1/00
[52] U.S. Cl. .................................... 426/262; 426/281; 426/302; 426/615; 426/325
[58] Field of Search ............. 426/263, 273, 281, 293, 426/296, 302, 310, 319, 615, 425, 426, 429, 508, 509, 262, 325

[56] References Cited

U.S. PATENT DOCUMENTS

| | | | |
|---|---|---|---|
| 1,018,909 | 2/1912 | Jacob | 426/615 |
| 1,633,379 | 6/1927 | Hupfel | 426/615 |
| 2,653,930 | 9/1953 | Dadley | 426/293 |
| 3,261,694 | 7/1966 | Forkner | 426/426 |
| 3,335,015 | 8/1967 | Forkner | 426/438 |
| 3,470,000 | 9/1969 | Hale | 426/263 |
| 3,658,554 | 4/1972 | Hirota | 426/302 |
| 3,843,810 | 10/1974 | Fehmerling | 426/438 |

OTHER PUBLICATIONS

*Appertizing or the Art of Canning*, pp. 534–543, Bittings, M. D., The Trade Dressroom, San Francisco, 1937.

"Some Factors Influencing Shrinkage of Mushrooms During Canning", McArdle & Curven, *Proc. Inter. Conf. Sci. Aspects of Mushrooms*, 5th, Philadelphia, 1962, pp. 547–557.

*Primary Examiner*—Joseph M. Golian
*Attorney, Agent, or Firm*—Weiser, Stapler & Spivak

[57] ABSTRACT

The process and apparatus for treating cultivated mushrooms including the steps of introducing washed and peeled mushrooms into an enclosure and subjecting the mushrooms to a vacuum for predetermined period of time. A treatment liquid containing a colloidal substance is then introduced into the enclosure. The mushrooms are permitted to remain in the treatment liquid for a period of time and then the treatment liquid is removed. The mushrooms are then washed and blanched to coagulate the colloidal substance within the interior of the mushrooms.

22 Claims, 1 Drawing Figure

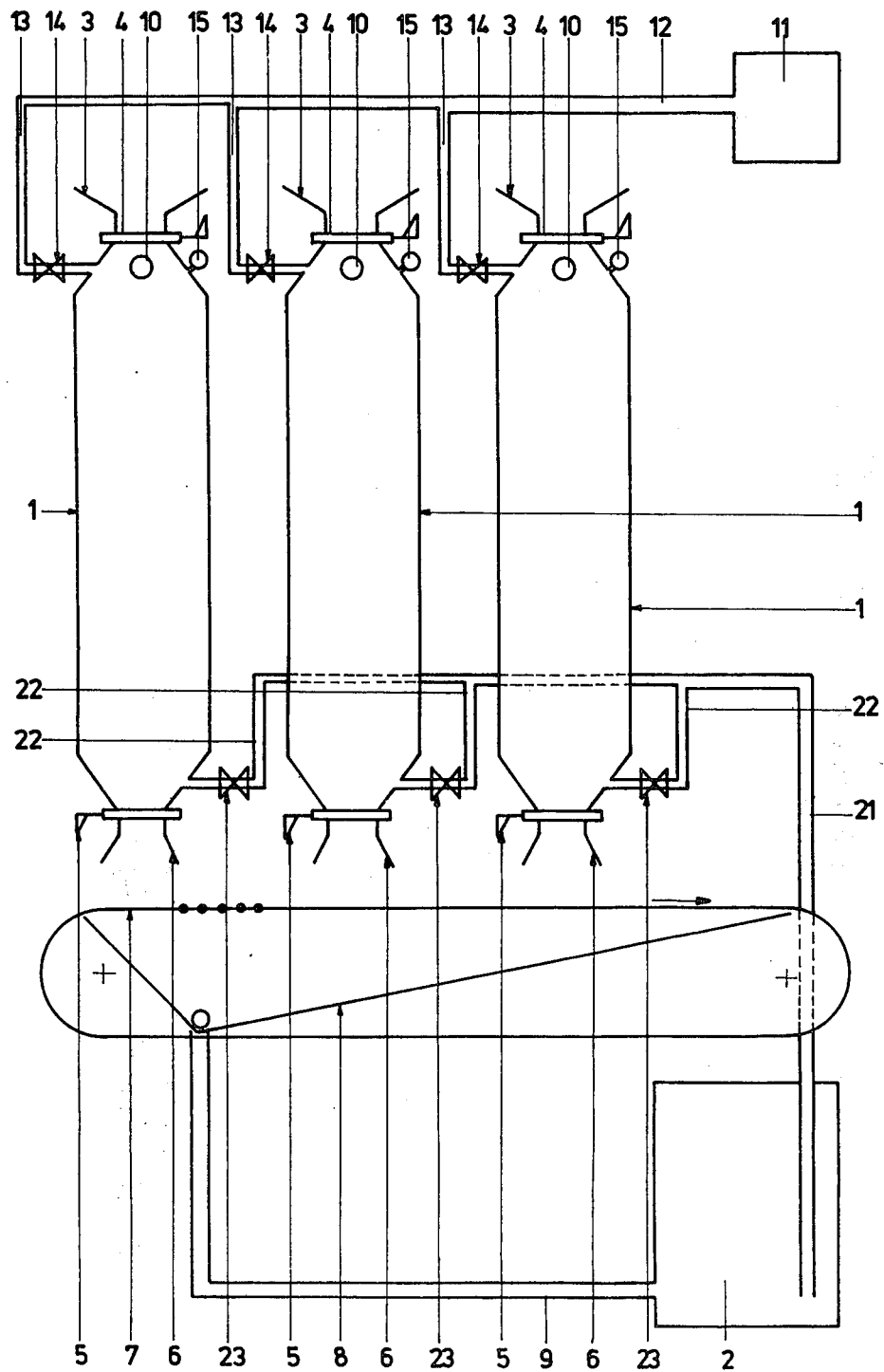

PROCESS FOR TREATMENT OF MUSHROOMS

RELATED APPLICATION

This application is a continuation-in-part of Ser. No. 608,272 filed Aug. 27, 1975 now abandoned which is a cont. of Ser. No. 394,275, Sept. 4, 1973 now abandoned.

BACKGROUND OF THE INVENTION

This invention relates in general to the field of food preparation and more particularly to a process and equipment for its practice pertaining to the treatment of cultivated mushrooms prior to canning.

In general, for purposes of preservation, cultivated mushrooms which are sometimes referred to as "Paris" mushrooms, are washed and peeled and then plunged into boiling water for a period of six to ten minutes prior to canning. This operation is called "blanching". The blanching results in the inactivation of enzymes, the coagulation of the albumin of the mushrooms and the freeing of the albumin of air.

In the course of the blanching process, the volume of the mushrooms diminishes and a significant fraction of the aromas, which are soluable, disappears. The same is true for part of the albumin. The mushrooms also suffer a loss of weight during this treatment.

The disadvantage of so treating mushrooms is that their taste is greatly diminished and their volume reduced. In addition, they turn yellow during the sterilization and blacken when they are exposed to air after the can is opened.

SUMMARY OF THE INVENTION

The present invention relates generally to the art of treating cultivated mushrooms, and more particularly, is directed to a method and apparatus for improving the quality of canned mushrooms with regard to taste, appearance and weight.

It is an object of the present invention to eliminate the disadvantages of the known processes for treating mushrooms and to provide a process and equipment for its practice which makes it possible to improve the taste of mushrooms through retention of their aromas, to improve the appearance of the mushrooms, to eliminate all blackening when the can is opened, to leave the mushrooms with their original color and composition and also to reduce the losses of aroma and of weight during blanching and sterilization.

To these ends, the invention involves a process characterized by subjecting the mushrooms to a predetermined vacuum for a limited period, after which they are placed in contact with a treatment liquid for a certain period. During the vacuum treatment, air and/or other gases, within the interstices of the mushroom, is evacuated and the evacuated space is then filled with the treatment liquid.

In accordance with a feature of the process, the treatment liquid contains a substance which coagulates under heat. This liquid is a mixture of the juice produced by boiling mushrooms in water, supplemented by a colloidal substance selected from the group consisting of egg white, casein, milk albumin, and carrageenan. The colloidal substance may constitute between ten to twenty-five percent by weight of the treatment liquid.

The colloidal substance should be edible and it is particularly desirable to use, as the colloidal substance, egg white or milk albumin, which have the advantage of a composition similar to that of the mushroom albumin.

This invention also relates to equipment functioning in cyclical fashion. This equipment is characterized in being composed of a treatment enclosure provided with a vacuum apparatus and a treatment liquid supply apparatus. The enclosure has valves for the introduction and removal of the mushrooms as well as to separate the treatment enclosure from the vacuum apparatus and the supply apparatus. The vacuum enclosure opens onto a conveyor for removal of the treated mushrooms.

The enclosure is oriented in a vertical or inclined position with respect to the horizontal and has its upper portion equipped with a supply hopper which is separated from the enclosure by an inlet valve. The lower portion of the enclosure terminates in an outlet orifice which is provided with a lower control valve. In a preferred embodiment, the vacuum apparatus is connected to the upper portion of the enclosure and the treatment liquid supply apparatus is connected to the lower portion of the enclosure.

In accordance with another feature of the invention, the treatment liquid supply apparatus consists of a reservoir which contains the treatment liquid and of a conduit connecting this reservoir to the lower portion of each enclosure by a valve. The low pressure prevailing in the enclosure as a result of the function of the vacuum apparatus is sufficient to draw the liquid into the enclosure after the valve has been opened.

The vacuum draws air or any other gases that may be present from the interior spaces defined within the mushrooms. The vacuum makes possible the penetration of the treatment liquid into the interior of the mushrooms. In a preferred embodiment, the treatment liquid comprises a mixture of water, mushroom juice and egg white or milk albumin in suspension. It is the egg white or milk albumin which obstructs the interstitial channels of the mushrooms by coagulating at the time of blanching. The coagulation prevents a part of the soluble mushroom juices from escaping into the blanching water.

It is therefore an object of the present invention to provide an improved process and apparatus for treating mushrooms of the type set forth.

It is another object of the present invention to provide a novel process and apparatus for treating mushrooms which includes the steps of subjecting previously washed and peeled mushrooms to a vacuum atmosphere for a predetermined period of time and then placing the mushrooms in contact with a treatment liquid for a predetermined period of time.

It is another object of the present invention to provide a novel process and apparatus for treating mushrooms which includes the steps of placing previously washed and peeled mushrooms into an enclosure and producing a vacuum within the enclosure for a period of time, and employing the vacuum for introducing a treatment liquid into the enclosure, the treatment liquid containing juice produced by boiling mushrooms and a colloidal substance.

It is another object of the present invention to provide a novel process and apparatus for treating mushrooms which includes the steps of placing previously washed and peeled mushrooms into an enclosure, producing a vacuum atmosphere within the enclosure for a predetermined period, introducing a treatment liquid into the enclosure for a predetermined period of time, said treatment liquid containing a broth produced by boiling mushrooms and a colloidal substance selected from the group consisting of egg white, casein and carrageenan.

Other objects and a fuller understanding of the invention will be had by referring to the following description and claims of a preferred embodiment thereof, taken in conjunction with the accompanying drawings wherein like reference characters refer to similar parts throughout the several views and in which:

BRIEF DESCRIPTION OF THE DRAWINGS

FIG. 1 is a schematic representation of the apparatus employed in practicing the present invention.

DESCRIPTION OF THE PREFERRED EMBODIMENTS OF THE INVENTION

Although specific terms are used in the following description for the sake of clarity, these terms are intended to refer only to the particular structure of our invention selected for illustration in the drawings, and are not intended to define or limit the scope of the invention.

Referring now to the drawings, we show in the single accompanying FIGURE, a schematic diagram of the process equipment operating in batch fashion.

According to the inventive process, washed and peeled mushrooms are treated in known manner. For further treatment of these mushrooms, they are subjected to a vacuum atmosphere of the order of 50 to 60 millimeters of mercury, during a relatively long period of time of the order of 1 to 10 minutes depending upon the size of the mushrooms. The vacuum acts to remove air or other gases from the interstices of the mushrooms. A vacuum corresponding to the stated range is a practical value that is easily obtained with known vacuum pumps of the water ring type. Greater vacuums result in little, if any, increased penetration of aromas within the mushrooms, but does result in increased apparatus cost. Maintaining the vacuum over ten minutes usually results in no improvement. A period of vacuum of approximately 2 minutes is usually sufficient. By this vacuum treatment, the mushrooms are prepared to receive the actual treatment liquid. At the end of the vacuum treatment period, the vacuum is relieved suddenly in periods of from 5 to 15 seconds and a treatment liquid is introduced into the enclosure containing the mushrooms. In a preferred embodiment, the vacuum is utilized to draw the treatment liquid from the reservoir 2.

This treatment liquid is a mixture of mushroom broth which is produced by boiling mushrooms and of an edible colloidal substance. This colloidal substance must be of the type that will coagulate under heat. For example, egg white, casein, lactalbumine, carrageenan or other substances may be used.

The treatment liquid is characterized by a mixture of approximately equal parts of water and mushroom juice. Finely divided egg white or lactalbumine is suspended in the liquid in a range of from 10 grams to 60 grams per liter. Optionally, liquid egg white of from 70 grams to 420 grams per liter may be employed.

The optimum proportion of finely divided egg white is from 40 to 60 grams per liter and the optimum for liquid egg white is from 280 to 420 grams per liter. It has been found that the mushroom juices and flavor are retained better when the proportion of egg white is raised, to the maximum of 60 grams per liter. Additional added egg white over the stated maximum appears to detract from the taste, rather than to enhance the taste.

The liquid may also contain, as desired, salt, spices, herbs, etc. for mushroom flavoring purposes.

It is especially desirable to use, in the treatment liquid, egg white or milk albumin as the colloidal substance because these have a composition similar to mushroom albumin. The mushroom broth and the egg white or lactalbumine must be thoroughly homogenized through slow agitation or by ultrasonics, or by any other suitable, known process.

The mushrooms are permitted to remain in the treatment liquid within the enclosures 1 for 5 to 10 minutes. It is also possible to place the treatment liquid in an enclosure first and then introduce the mushrooms and draw the vacuum subsequently.

Following this treatment, the mushrooms are thoroughly washed with running water and blanched for 6 to 10 minutes. During such blanching, the colloidal substance coagulates within the interstices of the mushrooms. It is noteworthy that the colloidal substance retains in the interior of the mushrooms, all of the natural aromas and permits the mushrooms to retain their appearance, color and original texture. The colloidal substance further acts to prevent blackening after can opening.

The inventive process, described above by way of example, can be practiced either by equipment working discontinuously or by equipment working continuously. The accompanying drawing shows equipment working discontinuously or by successive batches.

This equipment consists of a certain number of enclosures 1 (three enclosures are illustrated in FIG. 1 by way of example) in the form of cylinders which are oriented approximately vertical, or inclined with respect to the horizontal. Each enclosure 1 may have a volume of the order of approximately 1 cubic meter. These enclosures are connected at their upper portions to a vacuum pump 11 by a manifold 12 which is connected separately to each enclosure 1 by a branch conduit 13 and a vacuum valve 14. The internal pressure of each enclosure 1 is preferably metered by means of a monometer 15.

The lower portion of each enclosure 1 is connected to a treatment liquid reservoir 2 by means of a communal supply conduit 21 and individual, separate, liquid conduits 22. The liquid conduits 22 each lead to the lower portion of an enclosure 1 and are controlled by a liquid valve 23.

The upper portion of each enclosure 1 is provided with a hopper 3 connected to the enclosure 1 by means of a gate type control valve 4. The lower portion of each enclosure 1 is provided with a gate type discharge valve 5. Preferably, the control valves 4 and the discharge valves 5 are remotely, automatically operated in conventional manner, such as by employing solenoids or motor operators. All the outlet orifices 6 of the enclosures 1 open onto a conveyor 7 which may be a roller supported endless belt. Under the upper portion of the endless belt 7 is provided a trough 8 which connects by a recirculation conduit 9 to the reservoir 2. In the upper portions of the enclosures 1, ports 10 may be provided to permit viewing of the delivery of the treatment liquid (not shown) to the enclosure 1.

In operation, the mushrooms (not shown) are placed in the hoppers 3, and then into the enclosures 1 respectively by opening the control valves 4. After each enclosure 1 is filled with mushrooms, its control valve 4 is closed. Then, the vacuum pump 11 is energized to create a certain vacuum in the enclosures 1. At the end of this evacuation phase (after approximately one to ten minutes), depending upon the consistency of the mushrooms being treated, the gas or other material present in the cellular voids of the mushrooms will have been extracted. At that point, the liquid valves 23 are opened. The vacuum existing in the enclosures 1 draws the treatment liquid (not shown) from the reservoir 2 through the supply conduit 21 and the liquid conduits 22. The liquid valves 23 are than closed and the mushrooms become thereafter impregnated with the treatment liquid. At the end of this impregnation period, the liquid valves 23 are opened so that the treatment liquid flows back into the reservoir 2 by gravity. If necessary for liquid removal, any vacuum remaining in the enclosure 1 can be relieved in conventional manner. Then the discharge valves 5 are opened and the mushrooms are permitted to fall down onto the endless belt 7, upon which they drip dry. The treatment liquid not absorbed by the mushrooms falls into the trough 8 and from there is returned to liquid reservoir 2 via the recirculation conduit 9. The endless conveyor 7 transports the mushrooms to the washing and blanching stations (not shown) for further treatment. Preferably, the mushrooms are blanched for a period of approximately 6 to 10 minutes to coagulate the colloidal substance in the interior spaces of the mushrooms. The valves 23 and 5 are then reclosed thereby placing the enclosures back into condition to repeat the cycle of operation.

Since each enclosure 1 is provided with a vacuum valve 14 and a liquid valve 23, separately from the valves 14 and 23 of the other enclosures, the operation of this equipment does not require simultaneous working of all of the enclosures. Thus, the operating cycle of each enclosure 1 can be staggered with respect to the cycle of the preceeding enclosure in any manner desired.

In actual treatment tests, the following results were observed:

EXAMPLE I 1000 grams of peeled mushrooms were blanched normally in accordance with prior art standards. The yield was 530 grams of blanched mushrooms.

EXAMPLE II 1000 grams of peeled mushrooms were subjected to a vacuum treatment in water. After treatment, a total weight of 1100 grams was recorded. After six minutes of blanching, the mushrooms weighed 540 grams. After sterilization, the weight was reduced to 535 grams. After six months, the lot weighed 530 grams.

EXAMPLE III 1000 grams of peeled mushrooms were treated as in Example II with the exception that a mixture of water and mushroom juice was employed. The results were the same and the only noted difference noted was a slightly improved taste.

EXAMPLE IV 1000 grams of mushrooms from the same lot was treated with a mixture of equal parts of water and mushroom juice into which had been added 10 grams of finely divided egg white or 70 grams of liquid egg white. After vacuum treatment, the lot weighed 1110 grams. After 6 minutes of blanching in 10 liters of boiling water, the lot weighed 687 grams. After sterilization, the weight remained the same. After extended periods of time, up to 3 years, the weight remained the same. Improved taste was noted.

Tests have shown that the process of the present invention results in the absorption of treatment liquid into the mushrooms. The amount of absorption varies according to different kinds and ages of the treated mushrooms and the time elapsed since picking. This absorption of treatment liquid can vary from 100 to 350 ml. per kilogram of peeled mushrooms being treated.

Following treatment within the enclosures 1, the mushrooms are dropped upon the endless belt or conveyor 7. Washing is completed in a conventional rotative cylinder to remove all traces of juice from the surfaces.

After washing, the mushrooms are introduced into a boiling water or steam cooker. In a preferred embodiment, the boiling water cooker contains 10 liters of water per kilogram of mushrooms. It consists of a rotating steel cylinder containing a helical conveyor means which directs the mushrooms for a period of from 5 to 8 minutes, depending upon size. Steam or boiling water maintains an interior temperature of 100° C. and a pump circulates the liquid to allow evacuating of the mushrooms. The steam cooker comprises a half-cylindrical trough with vertical walls and a top cover thereon. The steam is introduced through the walls and a helical screw carries the mushrooms from one end to the other within 5 to 8 minutes, depending upon size. The small mushrooms are blanched faster than the large diameter mushrooms.

Although we have described the present invention with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather, only by the scope of the claims appended hereto.

What is claimed is:

1. The process for treating mushrooms having natural juices and interstices filled with air or other gases comprising the steps of placing the mushrooms within a container and subjecting the mushrooms to a vacuum sufficient to remove at least a part of the air or other gases from the interstices;

relieving the vacuum and introducing a mushroom broth treatment liquid containing an edible colloidal substance of the type adapted to coagulate under heat selected from the group comprising egg white, casein, milk albumin and carrageenan into the container to contact the mushrooms with the treatment liquid;

filling the interstice portions of the mushrooms with an effective amount of the treatment liquid to retain the natural juices, the said filled treatment liquid containing some of the edible colloidal substance;

removing the remainder of the treatment liquid from the container; and coagulating an effective amount of the edible colloidal substance contained in the filled treatment liquid within the interstice portions to obstruct the filled interstice portions, whereby natural aromas, color and appearance of the mushrooms are retained.

2. The method of claim 1 wherein the coagulation is by blanching.

3. The method of claim 2 wherein the blanching period is between 6 and 10 minutes.

4. The method of claim 1 wherein the vacuum is maintained between 50 and 60 millimeters of mercury.

5. The method of claim 4 which comprises subjecting the mushrooms to the vacuum for a period of between 1 and 10 minutes prior to introduction of the treatment liquid.

6. The method of claim 4 wherein the vacuum is maintained for a period of not greater than 10 minutes.

7. The process of claim 1 characterized by filling at least 100 mililiters of treatment liquid per kilo of peeled mushrooms into the interstice portions of the mushrooms.

8. The method of claim 1 wherein the edible colloidal substance is egg white.

9. The method of claim 1 wherein the edible colloidal substance is milk albumin.

10. The method of claim 1 which comprises contacting the mushrooms with the treatment liquid for a period of not greater than 10 minutes.

11. The method of claim 8 wherein the egg white is finely divided egg white and wherein the amount of finely divided egg white suspended is between 10 grams to 60 grams per liter of treatment liquid.

12. The method of claim 8 wherein the egg white is liquid egg white and the amount of liquid egg white suspended is between 70 grams to 420 grams per liter of treatment fluid.

13. The method of claim 9 wherein the amount of milk albumin suspended in the liquid is between 10 grams and 60 grams per liter of treatment liquid.

14. The method for treating mushrooms having natural juices and aromas and comprising cellular voids, comprising:
preparing a treatment liquid from a combination of mushroom broth and an edible, heat-coagulating substance selected from the group comprising egg white, casein, milk albumin and carregeenan, said treatment liquid comprising a first part for filling said mushroom cellular voids and a second supplementary part not filling said mushroom cellular voids;
placing the mushrooms within a container, then subjecting the mushrooms to a sufficient vacuum effective to evacuate the cellular voids and then relieving said vacuum;
introducing said treatment liquid into the container to contact the mushrooms with the treatment liquid;
filling said evacuated mushroom cellular voids with an effective amount of the said first part of the treatment liquid to retain the natural juices, the first part of the treatment liquid comprising some of the edible colloidal substance;
separating said second supplementary part of the treatment liquid from the mushrooms filled with said first part of the treatment liquid; and
heat-treating said filled mushrooms to coagulate an amount of the heat-coagulating substance of said first part of treatment liquid within the evacuated cellular voids effective to obstruct the filled cellular voids of the mushrooms and to retain the aromas of the mushrooms.

15. The method of claim 14 wherein the step of introducing said treatment liquid is provided after the step of placing the mushrooms, subjecting them to a vacuum and relieving said vacuum.

16. The method of claim 14 wherein the mushroom broth is a mixture in equal parts of water and mushroom juice.

17. The method of claim 14 wherein the treatment liquid contains in suspension at least 10 grams per liter of finely divided egg white.

18. The method of claim 14 wherein the treatment liquid contains in suspension at least 70 grams per liter of liquid egg white.

19. The method of claim 14 wherein the vacuum is maintained between fifty and sixty millimeters of mercury.

20. The method of claim 19 which comprises subjecting the mushrooms to the vacuum for a period of between 1 and 10 minutes.

21. The method of claim 14 wherein the coagulation is by blanching.

22. The method of claim 21 wherein the blanching period is between 6 and 10 minutes.

* * * * *